United States Patent
Fowler et al.

(10) Patent No.: US 6,177,944 B1
(45) Date of Patent: Jan. 23, 2001

(54) TWO PHASE RENDERING FOR COMPUTER GRAPHICS

(75) Inventors: Mark Christopher Fowler, Colchester; Kirk Steffen Haskell, Essex Junction; Robert Spencer Horton, Colchester, all of VT (US); Thomas Yu-Kiu Kwok, Washington Township, NJ (US); Steve Mastrianni, Unionville; Chandrasekhar Narayanaswami, Wilton, both of CT (US); Bengt-Olaf Schneider, Yorktown Heights, NY (US); Mark van Horn, Raleigh, NC (US); James Lewis van Welzen, Longmont, CO (US)

(73) Assignee: International Business Machines Corporation, Armonk, NY (US)

(*) Notice: Under 35 U.S.C. 154(b), the term of this patent shall be extended for 0 days.

(21) Appl. No.: 09/156,934

(22) Filed: Sep. 18, 1998

(51) Int. Cl.[7] .................................................. G06F 15/00
(52) U.S. Cl. ................................................................ 345/426
(58) Field of Search .................................... 345/426, 433, 345/434, 118, 121

(56) References Cited

U.S. PATENT DOCUMENTS 5,652,880 * 7/1997 Seagraves ............................. 395/614
5,862,508 * 1/1999 Nagaya et al. ........................ 345/473

* cited by examiner

Primary Examiner—Phu K. Nguyen
(74) Attorney, Agent, or Firm—Douglas W. Cameron

(57) ABSTRACT

A method and apparatus for a computer graphics rendering system which slices the traditional geometry pipeline into two phases to improve overall graphics system utilization is described. The graphics system consists of a host processor and a graphics adapter. The host creates work items and feeds them to the graphics adapter. In the two phase method, the first phase computes the clipping status and immediately returns this status information, before completion of the actual clipping, to the application running on the host processor to minimize stalling the host processor and hence the application. The second phase performs the rest of the work necessary to draw the objects on the screen. The advantage of two phase method is that the host processor minimizes its wait (but only for model/view transformation and clipping status determination) for a return status from the graphics adapter for the current work item and gets to create the next work item from the application sooner.

15 Claims, 5 Drawing Sheets

TWO PHASE RENDERING FOR COMPUTER GRAPHICS

TECHNICAL FIELD

This invention relates generally to a computer graphics system for processing and displaying graphical data representing three-dimensional objects and, more particularly, to methods for synchronizing and distribution work assignments in the graphics system consists of a host processor and a graphics adapter.

BACKGROUND OF THE INVENTION

Computer graphics systems are frequently used to model a scene having three-dimensional objects and display the scene on a two-dimensional display device (31) such as a cathode ray tube or liquid crystal display. Typically, the three-dimensional objects of the scene are each represented by a multitude of polygons (or primitives) that approximate the shape of the object. Rendering the scene for the display on the two-dimensional display device is a computationally intensive process. It is therefore frequently a slow process, even with today's microprocessors and graphics processing devices.

Referring to FIG. 1, a multiprocessor is a machine containing more than one data processor (e.g., host processor (32) and geometry processor (38)). The processors may be connected to each other by a bus or by a cross bar switch. Each of the processors may have an associated cache memory. The host processor and the geometry processor share a common system memory (33) through the bus or cross bar switch and the associated cache (if provided). Each processor may also have a private or local memory (36) that is not accessible to the other processors.

Each of the processors of the multiprocessor may execute an associated task. For example, an audio application or task may run on one processor while a video application may run on another processor. In this case each processor executes its task in a substantially independent manner without any strong interaction between the tasks running on the other processors.

In other cases, of most interest to this invention, a single task is partitioned into sub-tasks that are then executed cooperatively on two or more processors by assigning one processor to one sub-task. When several processors cooperate in this manner to execute a single task, they typically need to share, in a fair manner, common resources such as memory, as well as buffers, printers, and other peripherals. In addition, the processors typically need to communicate with one another so as to share information needed at checkpoints, to wait for other processors to complete a certain routine, to signal to other processors that the processor is done with its assigned sub-task, etc.

A master-slave system is the simplest implemented system that supports multiprocessing within a single job. In this master-slave system, a predefined processor is declared the master and is permitted to execute the operating system. The other processors, denoted slaves, may execute only user applications. In practice a master-slave system permits the slaves to perform some easily paralleled operating system functions. Unlike separate supervisors, a master-slave system permits true parallelism within a single job, but only for user applications. The operating system itself is essentially serial, with all but the most trivial functions executed on the unique master processor. For a modest number of processors and a computationally heavy work load, paralleling the user's applications may be adequate, and the master-slave system has the advantage of simplicity over the more ambitious symmetric systems.

The generic 3D graphics system as shown in FIG. 1 consists of a host processor (32) and a graphics adapter (30) as a master-slave system with the host processor being the master and the graphics adapter being the slave. For most applications, part of the application runs on the host processor, and the rest runs on the graphics adapter. FIG. 2 shows the processing steps for rendering an object in a 3D graphics system shown in FIG. 1. The host creates work items and feeds them to the graphics adapter. With existing schemes the host processor waits for the graphics adapter (14) to return a status for the current work item before proceeding with the next work item (11) in the application. In such a master-slave system, the application goes through the scene database and sends down a set of objects (11) to be rendered along with its material properties, and attributes (12) such as location and, rasterization parameters, etc., to the graphics rendering system. See [Foley], which is incorporated herein by reference. Material properties could include shininess, emissivity, ambient color, diffuse color, specular color, texture, of the model. This work is done on the host processor being the master and corresponds to the first 3 boxes on the left column (11, 12, 13) in FIG. 2. The graphics rendering is performed on the graphics adapter being the slave, and this rendering corresponds to the work listed in all the boxes on the middle and right columns in FIG. 2. The graphics adapter receives objects from the host (15) and does the following. It first transforms the position of the objects from model coordinates into normalized device coordinates (NDC) (16). Referring to FIG. 3, the view volume (31), defined in NDC, determines which portion of space is visible to the viewer. Objects falling outside the view volume (41) are discarded from further processing (trivial rejection). Objects entirely contained in the view volume (42) remain unchanged and are sent to the lighting stage (trivial acceptance). Objects that intersect the boundary of the view volume (43, 44) are clipped against the view volume, i.e., split into a portion inside and a portion outside the view volume; the inside portion is then sent to the lighting stage (19). FIG. 3 shows the trivial accept (42), trivial reject (41), and clipped cases (43, 44). The application sending the objects often can make use of the trivial accept/reject/clip (status) information (21 of FIG. 2) for the object to 1. decide whether other objects need to be sent for the current frame by using hierarchical geometric models or by using inter-object visibility information,
2. decide whether this object needs to be sent for the next frame by using frame to frame coherence,
3. determine whether the object needs to be lighted, and
4. determine the level of tessellation required for the current or next frame.

The status returned could also be used by the host processor in several ways. For example, if previous data was rejected trivially the application may know that current data is also likely to be rejected because of the way the model is stored. So it may then decide to tessellate the current data (i.e., break up the geometric model into triangles) at a coarser level, i.e., with fewer triangles and speed up overall processing. The other rationale for this coarser tessellation is that, even if part of the current data is accepted (not rejected trivially), the triangles for the current data are likely to be near the corner of the viewing region, and the system may render such models with less detail, i.e., with fewer triangles.

Similarly, a status of trivial accept could signal to the application that objects have to drawn with more detail. For example, an application could send down a teapot with 100 triangles, and if the return status says that this teapot was accepted trivially, it can send down the same teapot with 5000 triangles. The teapot sent last would draw on top of the previous teapot. The ratio of accepts to rejects may also help the application to restructure the processing algorithm itself. The application may use bounding boxes around objects and do application level clipping if it knows that a high proportion of the objects are being rejected. If a high ratio of objects is being accepted, the application may turn off bounding box based clipping. Since the application responds to the clipping status as described above, after sending a work item, consisting of a group of objects, the application waits (14) for the graphics adapter to return the clipping status (21) for the work item, so the host processor is actually executing the flow diagram shown in FIG. 2.

Referring to FIG. 2, after the clipping stage (18), the graphics adapter performs lighting (19), perspective transformation and projection (20), for all vertices in the group of objects. Then the clipping status is returned to the host (21). Finally, it sends the group of objects (22) to the rasterizer (37 of FIG. 1) for rasterization (23) or scan conversion and fragment processing after which they appear on the display (31 of FIG. 3).

Let us define t1 as the time spent by the host to fetch a set of objects from the application, t2 as the time spent by the host to determine the properties and attributes of a set of objects, t3 and t4 as the time it takes to transfer a set of objects from the host to the graphics adapter, t5 as the time spent by the graphics adapter to carry out model and view transformations, t6 as the time spent by the graphics adapter to determine the clipping status, t7 and t8 as the time spent by the graphics adapter to do the clipping and lighting calculations respectively, t9 as the time spent by the graphics adapter to carry out the perspective transformation and division as well as projection, t10 as the time it takes to return the clipping status from the graphics adapter to the host, t11 as the time spent by the graphics adapter to send a set of objects to the rasterizer. The problem with the method outlined thus far is that the graphics adapter usually takes a significantly longer period of time (about 10 times longer) (t4+t5+t6+t7+t8+t9) to process the work item than it takes for the host to generate it (t1+t2+t3). Thus, in the flow diagram for the host in FIG. 2, the host spends most its time waiting for the status (tn=t4+t5+t6+t7+t8+t9+t10−t1−t2−t3) while the graphics adapter is doing its work as shown in FIG. 2. So instead of going to work on the next set of objects, the host is wasting its processing power. With rapid advances in CPU design even small waits for the processor mean a lot of wasted capacity. The traditional solution to this problem is to use task switching on the CPU rather than wait for the graphics adapter to return status. However, this is not a good idea because the time taken for processing a work item is much smaller (in the order of milliseconds on current CPUs) than a process slice in the operating system (20–55 milliseconds). Thus, a solution that puts the host process to sleep as soon as it sends a work item to the graphics adapter and that wakes up the host process when the return status is available from the graphics adapter will have enormous software overheads and therefore be terribly inefficient.

In a master-slave graphics system as just described, applications communicate with the graphics subsystem through a graphics API (Application Programming Interface). Besides providing an unified interface to the functionality of the graphics pipeline (FIG. 2), the API also encapsulates and thereby hides the implementation details of how the graphics pipeline is distributed between the host (master) and the graphics adapter (slave) and of how the host and the graphics adapter communicate. Some graphics APIs, e.g. Direct 3D (D3D) from Microsoft Corporation, provide feedback about the operations performed by the API for priorities submitted by the applications. For instance, Direct 3D informs the application whether a primitive is needed to be clipped against the view frustums. This information is provided as a return value from the function called by the application to submit a primitive. Unfortunately, determining this status return value requires substantial processing within the graphics subsystems, resulting in undue delay before returning from the API call to the application. Since the application is blocked while waiting for the API call to return, an inefficient implementation of this feature will result in slow performance of an application written to such APIs.

OBJECTS AND ADVANTAGES OF THE INVENTION

It is an object and advantage of this invention to provide an improved method and apparatus for a computer graphics rendering system which slices the traditional geometry pipeline into two phases to improve overall graphics system utilization.

It is, therefore, an object of this invention to minimize the time between calling an API function for rendering a primitive and returning a clip status value from that function.

Processing time for the display of objects is reduced because of the overlapping of the transformation/status determination step (first phase) for one work item with the lighting and rasterization for the previous work item, where lighting and rasterization are parts of the second phase.

The first phase may be performed by the host, instead of by the graphics adapter, if necessary for better load balancing under heavy rendering and system load conditions.

Storage requirements for the graphics adapter (less state and instructions) are reduced.

Improved locality of code by using smaller code fragments reduces instruction cache misses.

SUMMARY OF THE INVENTION

The foregoing and other problems are overcome and the objects of the invention are realized by methods and apparatus in accordance with embodiments of this invention. This invention is a method and apparatus for a computer graphics rendering system which slices the traditional geometry pipeline into two phases to improve overall graphics system utilization. The graphics system consists of a host processor and a graphics adapter as a master-slave system with the host processor being the master and the graphics adapter being the slave. For most applications, part of the application runs on the host processor and the rest runs on the graphics adapter. The host creates work items and feeds them to the graphics adapter. In the disclosed two phase method of this invention, the first phase computes the clipping status and immediately returns this status information, before completion of actual clipping, to the application running on the host processor to minimize stalling the host processor and hence the application. The second phase performs the rest of the work necessary to draw the objects on the screen. As a result, the host processor can minimize its wait for the return clipping status from the graphics adapter for the current work item and gets to create the next work item from the application sooner.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
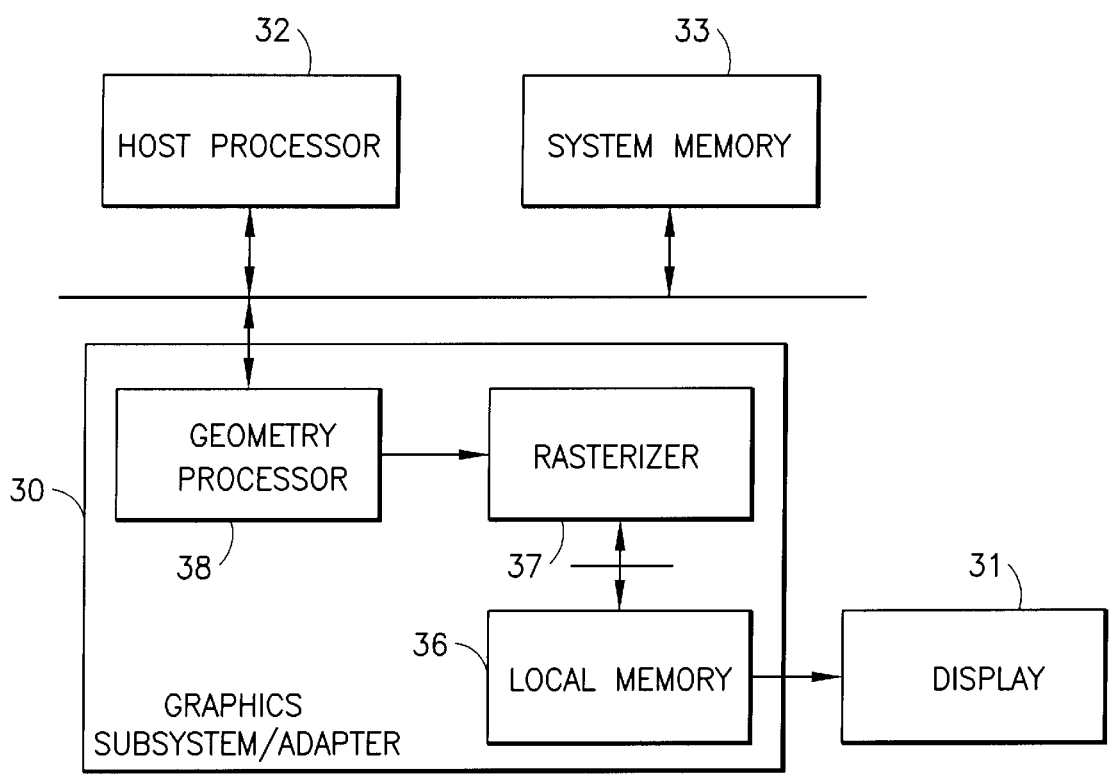
FIG. 1 describes a generic 3D graphics system.
Figure 2:
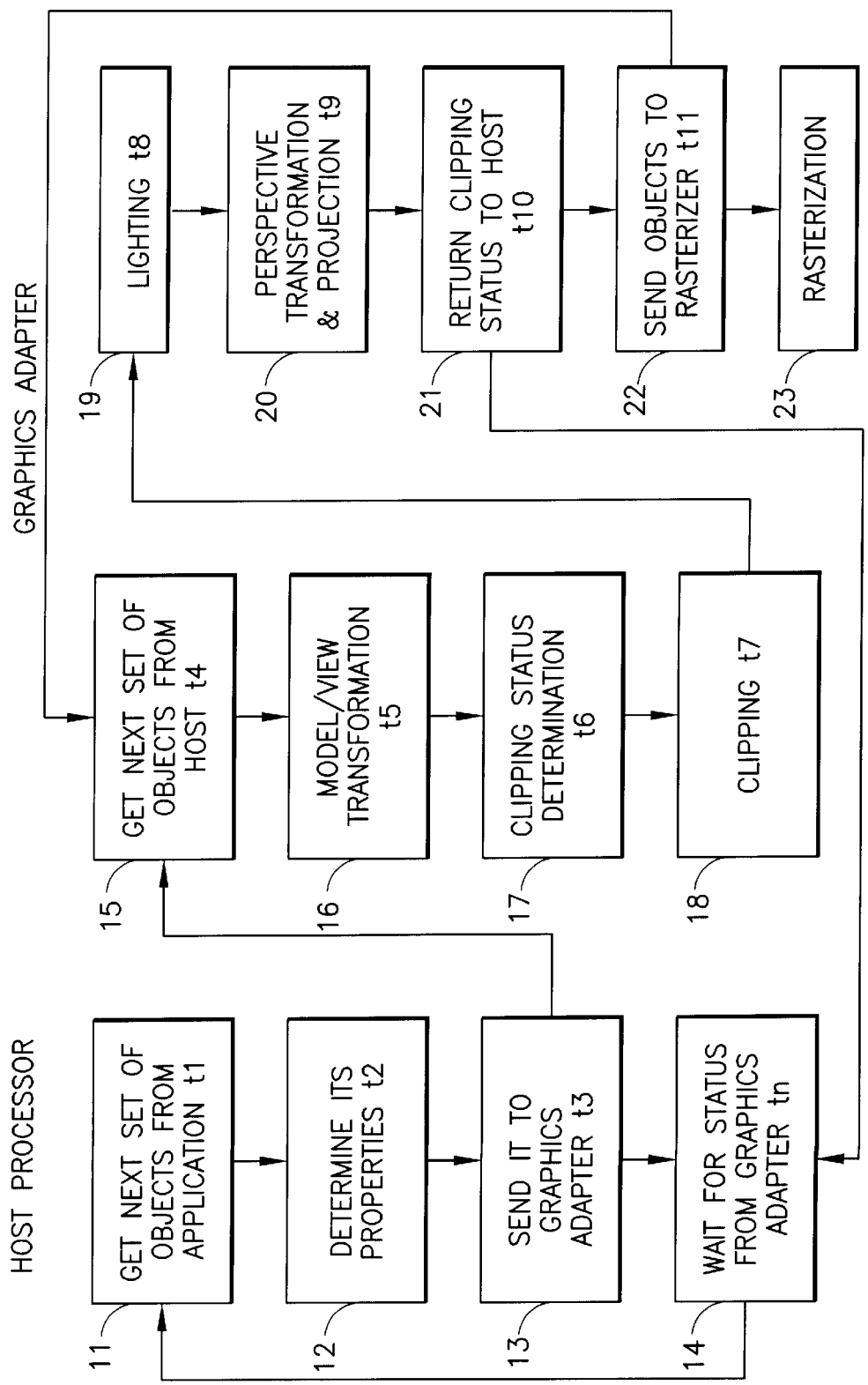
FIG. 2 is a flow diagram for traditional processing steps and rendering in the graphics pipeline.
Figure 3:
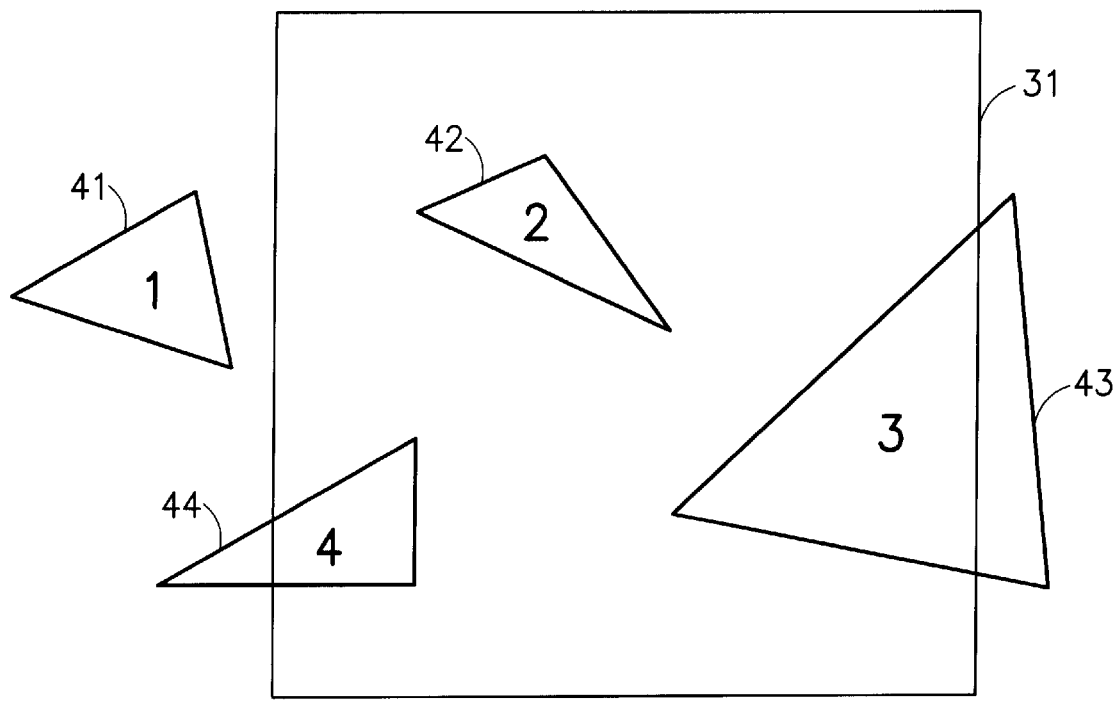
FIG. 3 is a view port in clip coordinates with various triangles. Triangle 1 is trivially rejected. Triangle 2 is trivially accepted. Triangles 3 and 4 need to be clipped.
Figure 4:
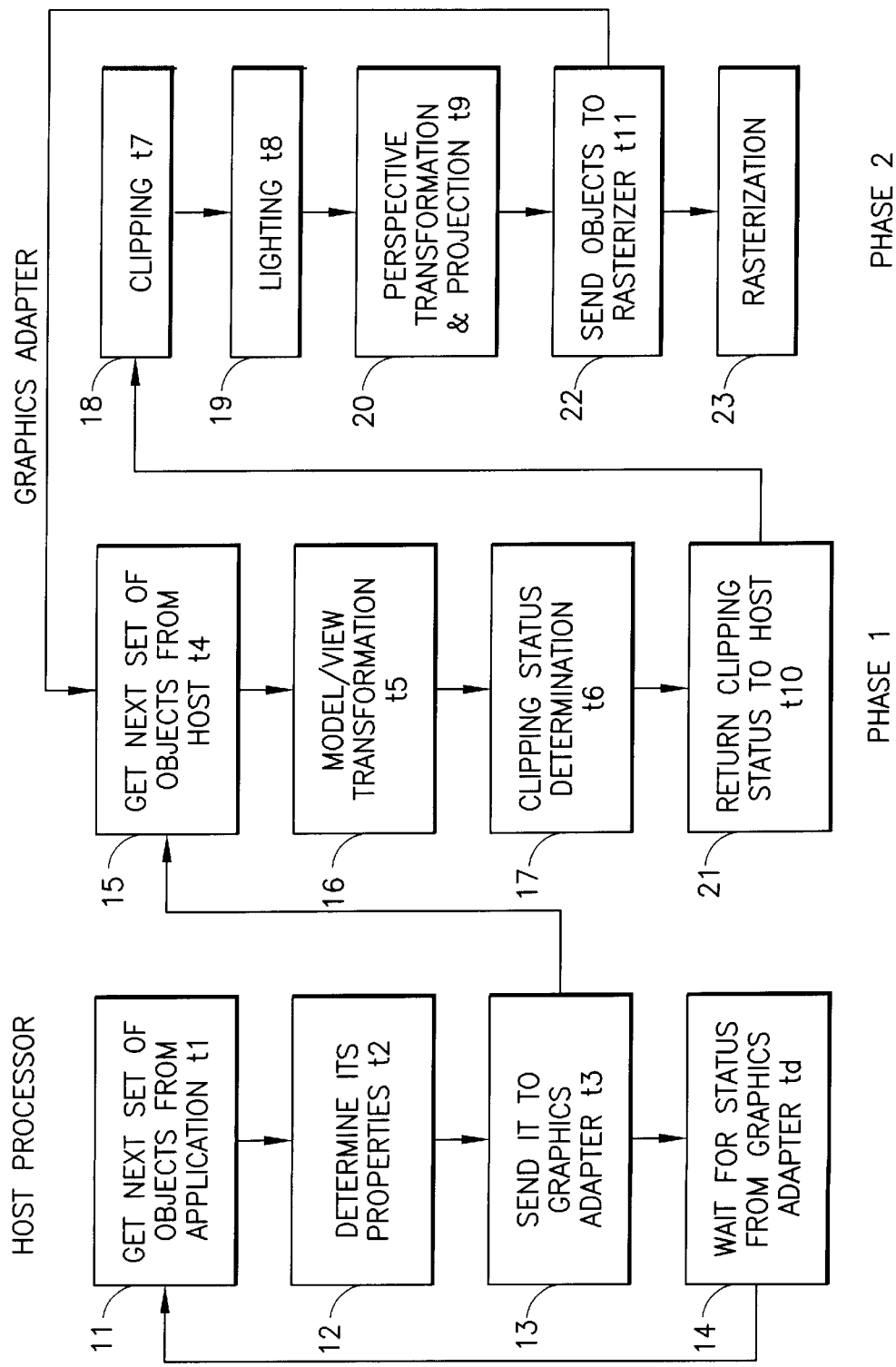
FIG. 4 is a flow diagram for the processing steps and the two phase rendering in the graphics pipeline where the processor regains control after the first phase.

FIG. 4 shows the processing steps and two phase rendering in a graphics pipeline of a 3D graphics system shown in FIG. 1. In such a master-slave system, the host first gets a set of objects from the application (11) by going through the scene database. Then, it determines the attributes (location and rasterization parameters etc.) or material properties (12) for a set of objects. Finally, it sends down a set of objects to be rendered to the graphics adapter (13). This work is done on the host processor being the master, and corresponds to the first 3 boxes (11, 12, 13) in the left column of FIGS. 2 and 4. The graphics rendering is performed by the graphics adapter as the slave and this rendering corresponds to the work listed in all the boxes in the middle and right columns of FIG. 4. The application sending a set of objects often can make use of the trivial accept/reject/clip (status) information for the object to 1. decide whether other objects need to be sent for the current frame by using hierarchical geometric models or by using inter-object visibility information,
2. decide whether this object needs to be sent for the next frame by using frame to frame coherence,
3. determine whether the object needs to be lighted, and
4. determine the level of tessellation required for the current or next frame.

For this reason after sending a work item, consisting of a group of objects, the application waits for the graphics adapter to return only the clipping status for the work item (14), of waiting until after perspective transformation on projection (20). So the host processor is actually executing the flow diagram shown in FIG. 4.

In order to minimize the wait for the host (td), the present invention splits the work for the graphics adapter into two phases as shown in FIG. 4. The first phase on the graphics adapter does only the work necessary to compute the return status (21) and defers the rest of the work to the second phase. In the first phase, the graphics adapter receives a set of objects from the host (15) and does the following. It first transforms the position of the objects from model coordinates into normalized (viewing) device coordinates (NDC) (16). It uses the view volume (31), defined in NDC, to determine the clipping status (17). Then, it immediately returns the clipping status to the host (21) before going into phase 2. In the phase 2, it does the more time consuming jobs of carrying out the clipping (18) and lighting (19) calculations. The graphics adapter performs lighting for all vertices in a set of objects. It also does the perspective transformation and division as well as projection (20). Finally, it sends a set of objects to the rasterizer (22). The rasterizer (23 or 37) is used for scan conversion and fragment processing after which a set of objects appears on the display (31). Such a split of the work into two phases allows the graphics adapter to compute and return the status information to the host (21) earlier and thus minimizes the wait for the host processor (td=t4+t5+t6+t10−t1−t2−t3). Thus, the waiting time saved by the host in this invention is ts where ts=tn+td=t7+t8+t9.

Figure 5:
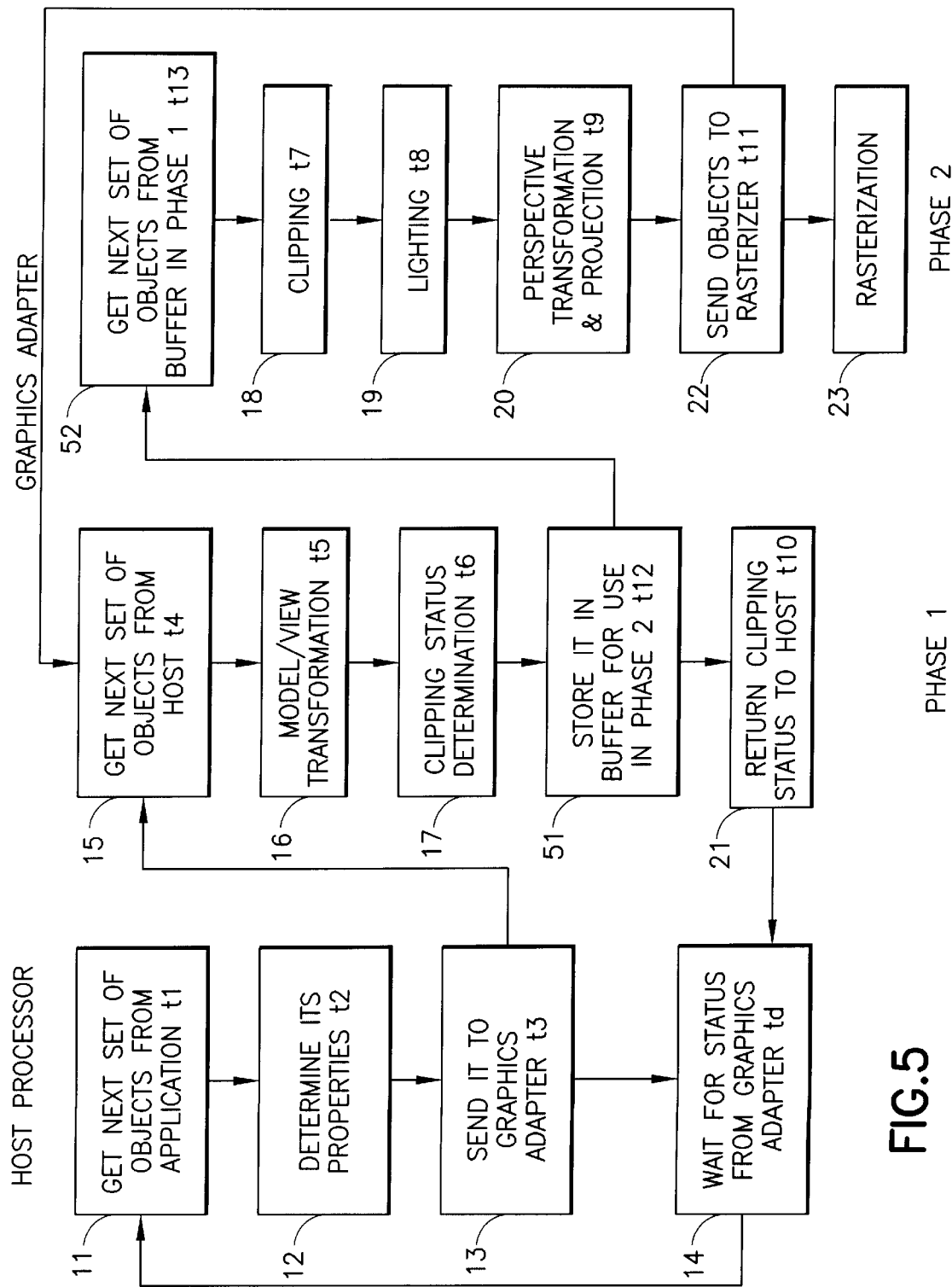
FIG. 5 is a flow diagram for the processing steps and the two phase rendering in the graphics pipeline with a buffer to store work items temperately.

If the graphics adapter is not fast enough to process the work items at the rate they are generated by the host, a buffer of work items (51, 52) will be created to handle the mismatch between the rate of production and consumption as shown in FIG. 5. In this case, (t4+t5+t6+t7+t8+t9+t10) is greater than (t1+t2+t3).

This buffer also stores the information on each set of objects and the clipping status for each of the objects in the buffer for use in phase 2 (51). In the second phase, the graphics adapter first gets a work item, the information on a set of objects and the clipping status (52). Then the graphic adapter goes on to do the clipping (18) and lighting (19) calculations, and to the carrying out of the perspective, transformation, division and projection (20). Finally, it sends down a set of objects to the rasterizer (22). In this case, the waiting saved for the host ts is decreased by t12 where t12 is the time spent by the graphics adapter to store a work item, the information on a set of objects and the set's clipping status in a buffer in phase 1 for later use in phase 2. t13 is the time spent by the graphics adapter to get a work item, information on a set of objects and the set's clipping status from the buffer for use in phase 2. Thus, ts=tn−td=t7+t8+t9−t12. Once the buffer is completely filled up, the host migrates to do other tasks on the system and returns to the current task when the buffer is not completely full. This buffer for storing sets of objects in the graphics adapter is filled and flushed by the graphics adapter sequentially as the first set being in and the first set being out.

Reference

J. D. Foley, A. van Dam, S. K. Feiner, J. F. Hughes, "Computer Graphics: Principles and Practice," Addison-Wesley, Reading, Mass., 2nd Edition, 1990.

This Foley reference is hereby incorporated herein by reference.

What is claimed is:

1. In a computer system having a display device, a method of minimizing waits between a master and slave subsystem of said computer system for displaying a number of objects on said display device, said method comprising:
   a. receiving objects by said slave subsystem;
   b. transforming said objects from model to normalized device coordinates by said slave subsystem;
   c. determining status information on which of said objects have said viewing device coordinates which fall outside of a selected viewing area in said display device; and
   d. processing said status information by said slave subsystem for final display on said display device while said master subsystem performs other processes.

2. A method as recited in claim 1, wherein one of said other processes comprises fetching said objects from system memory.

3. A method as recited in claim 1, wherein one of said other processes comprises determining of properties for a set of said objects.

4. A method as recited in claim 3, wherein said properties comprise material properties which comprise shininess and shading.

5. A method as recited in claim 4, wherein said slave subsystem is a graphics adapter.

6. A method as recited in claim 3, wherein said slave subsystem determines lighting from said properties.

7. A method as recited in claim 3, wherein said properties are transmitted to said slave subsystem.

8. A method as recited in claim 1, wherein said status determination is used to determine whether to accept, reject or clip each of said objects.

9. A method as recited in claim 1, wherein processing said status information comprises clipping, lighting and projection.

10. A method as recited in claim 9, wherein said projection comprises perspective transformation and division.

11. A method as recited in claim 1, further comprising:
   a. storing said objects in a buffer before processing said status information.

12. A method as recited in claim 11, wherein said objects are retrieved from said buffer on a FIFO basis.

13. A method as recited in claim 1, wherein said computer system comprises a plurality of slave subsystems.

14. A method as recited in claim 13, wherein one of said slave subsystems performs model and viewing transformations and clipping status determination, while another of said subsystems performs clipping, lighting, perspective transformation, and projection, and while said host processor determines material properties of a set of objects.

15. A program storage device readable by a computer system, tangibly embodying a program of instructions executable by said computer system to perform method steps for minimizing waits between a master and slave subsystem of said computer system for displaying a number of objects on a display device, said method comprising:
   a. receiving objects by said slave subsystem;
   b. transforming said objects from model to normalized device coordinates by said slave system;
   c. determining status information on which of said objects have said viewing device coordinates which fall outside of a selected viewing area in said display device; and
   d. processing said status information by said slave subsystem for final display on said display device while said master subsystem performs other processes.

* * * * *